(12) United States Patent
Baber et al.

(10) Patent No.: US 7,171,691 B2
(45) Date of Patent: Jan. 30, 2007

(54) CONTENT SANITATION VIA TRANSCODING

(75) Inventors: Stephen C. Baber, Sanford, NC (US); Ajamu A. Wesley, Raleigh, NC (US)

(73) Assignee: International Business Machines Corporation, Armonk, NY (US)

( * ) Notice: Subject to any disclaimer, the term of this patent is extended or adjusted under 35 U.S.C. 154(b) by 902 days.

(21) Appl. No.: 10/120,046

(22) Filed: Apr. 10, 2002

(65) Prior Publication Data

US 2003/0196104 A1    Oct. 16, 2003

(51) Int. Cl.
| | |
|---|---|
| G06F 11/00 | (2006.01) |
| G06F 11/22 | (2006.01) |
| G06F 11/30 | (2006.01) |
| G06F 11/32 | (2006.01) |
| G06F 11/34 | (2006.01) |
| G06F 11/36 | (2006.01) |
| G06F 12/14 | (2006.01) |

(52) U.S. Cl. .......................... 726/24; 726/3
(58) Field of Classification Search ................ 726/22, 726/23, 24, 3
See application file for complete search history.

(56) References Cited

U.S. PATENT DOCUMENTS

| | | | |
|---|---|---|---|
| 5,613,002 A | | 3/1997 | Kephart et al. |
| 5,918,008 A | | 6/1999 | Togawa et al. |
| 6,088,803 A | * | 7/2000 | Tso et al. .................... 726/22 |
| 6,269,456 B1 | | 7/2001 | Hodges et al. ................ 714/38 |
| 6,675,174 B1 | * | 1/2004 | Bolle et al. .............. 707/104.1 |
| 7,020,721 B1 | * | 3/2006 | Levenberg .................. 709/246 |
| 2003/0065645 A1 | * | 4/2003 | Itoh et al. ...................... 707/1 |
| 2003/0069881 A1 | * | 4/2003 | Huttunen ....................... 707/5 |
| 2003/0097378 A1 | * | 5/2003 | Pham et al. ................ 707/200 |
| 2003/0144849 A1 | * | 7/2003 | Kakivaya et al. .............. 705/1 |

OTHER PUBLICATIONS

Katashi Nagao, Web Engineering, Semantic Annotation and Transcoding Making Web Content More Accessible; IEEE 2001, retrieved date Dec. 1, 2005.*

* cited by examiner

Primary Examiner—Gilberto Barron
Assistant Examiner—Samson Lemma
(74) Attorney, Agent, or Firm—Jeanine Ray-Yarletts, Esq.; Steven M. Greenberg, Esq.; Carey, Rodriguez, Greenberg & Paul, LLP

(57) ABSTRACT

A content sanitization process performed via a transcoding engine. The transcoding engine can include one or more patterns, each pattern identifying malicious content in a well-formed document. The transcoding engine also can include an annotation processor configured to annotate portions of the well-formed document which match the patterns. Finally, the transcoding engine can include a content sanitization processor configured to normalize the annotated portions in a transcoded document. In a preferred aspect of the invention, the transcoding engine can include a privacy policy resolution processor configured to identify terms of a privacy policy and to annotate portions of the well-formed document which violate the terms.

13 Claims, 2 Drawing Sheets

CONTENT SANITATION VIA TRANSCODING

BACKGROUND OF THE INVENTION

1. Statement of the Technical Field

The present invention relates to computer virus detection and sanitation and more particularly to on-line content screening and sanitation.

2. Description of the Related Art

The growth of public networks such as the Internet has driven corresponding, but exponentially increasing growth in the generation and distribution of content across the public network. Initially, content had been formatted in one of a handful of content formats and distributed accordingly. Still, with the advent of the World Wide Web and the Web browser, a movement emerged in which content distributed over the Internet could be uniformly formatted using markup tags as in the hypertext markup language (HTML). Nevertheless, as it became apparent that the substance of content ought to remain separate from the formatting and presentation elements of content, new formatting technologies evolved. Thus, the idea of transforming content from one format to another followed.

In the field of global data communications, the sharing of content can be achieved by expressing that data using the extensible markup language (XML). Once expressed in XML, content can be sampled by multiple interested parties before ultimately becoming consumed. For example, XML content can be sampled by a transcoding engine and transformed using extensible stylesheet (XSL) or XPath technologies into a renderable XML-based grammar such as XHTML or WAP/WML. This renderable XML ultimately can be consumed by a client browser or a pervasive device. Hence, transcoding systems can provide a cost effective and efficient means for re-purposing formatted content in support of application data interchange.

Historically, HTML forms provided a mechanism for forms based input through which interactive Web applications could receive and process user input. HTML based Web forms, however, did not separate the purpose of the form from the presentation of a form. To address this clear deficiency, XForms were created in which the presentation of the form and the content of the form remained separate. XForms include separate sections which describe what the form ought to do, and how the form ought to appear. Thus, XForms decouple data, purpose/logic and presentation of a form.

Notably, XForms while having provided many advantages to application developers, also provide some advantages to malicious hackers. Specifically, XForms have been recognized as a vulnerability which can be exploited to gain unauthorized access to an otherwise protected enterprise. In that regard, a common content-based hack-attack leverages the structure and use of forms through which the hacker can route masqueraded data to enterprise servers co-located within the enterprise.

In particular, using XForms, hackers can stealthly submit malicious code into an otherwise protected enterprise through a seemingly innocuous form input element. Traditionally, the responsibility of protecting the enterprise from external hack-attacks had been left largely to individual trusted users in the enterprise. Yet, in view of notably successful hack-attacks such as the "Code Red" worm, it has become clear that the problem of protecting the enterprise from an external content-based hack-attack may soon escalate to the level where the protection of the enterprise cannot be left to individual users.

In the context of virus protection, many anti-virus technology vendors have recognized the advantage of providing centralized anti-virus functionality. Other anti-virus technology vendors have developed anti-virus programs which trap virus-laden downloads in transit between the file source and the enterprise. Still, conventional anti-virus technologies wholly ignore the transfer of content through form based input elements. Moreover, conventional anti-virus technologies lack malicious content cleansing functionality.

Thus, it would be desirable to relieve individual users from the task of monitoring and controlling content flow to and from the enterprise in order to detect and cleanse malicious content. Specifically, it would be advantageous firstly to monitor content before the content enters the enterprise, and secondly, to modify malicious content in an manner so as to transform the malicious content into non-malicious content. Finally, it would be desirable to view and use malicious content instead of merely blocking the entrance of malicious content into the enterprise.

SUMMARY OF THE INVENTION

The present invention is a content santization process. The process can be performed in a transcoding engine. The transcoding engine can include one or more patterns, each pattern identifying malicious content in a well-formed document. The transcoding engine also can include an annotation processor configured to annotate portions of the well-formed document which match the patterns. Finally, the trancoding engine can include a content sanitization processor configured to normalize the annotated portions in a transcoded document.

In a preferred aspect of the invention, the transcoding engine can include a privacy policy resolution processor configured to identify terms of a privacy policy and to annotate portions of the well-formed document which violate the terms. In that regard, the privacy policy resolution process can be configured to particularly process privacy policies specified according to the Platform for Privacy Preferences (P3P). Notably, the patterns can include a set of Xpath expressions. Alternatively, the patterns can include a set of extensible stylesheet XSL transformation expressions. Of course, the patterns can include both a set of Xpath and XSL transformation expressions.

The content sanitization method can include the steps of ensuring that a subject document has been well-formed; locating malicious content in the well-formed document; annotating the malicious content for further processing; and, transcoding the well-formed document. Importantly, the transcoding step can produce a transcoded document, yet the annotated content can be excluded from the transcoded document. In a preferred aspect of the invention, a privacy policy having one or more privacy terms can be accessed. Subsequently, content in the well-formed document can be located which violates one or more of the privacy terms in the privacy policy. In consequence, the located content which violates the privacy terms can be annotated.

As it is known that hack-attacks can capitalize on the inherent vulnerabilities of forms-based transactions, in one aspect of the invention the locating step can include the step of locating fields of a form element which contain candidate text that can be interpreted as malicious content. In that case, the annotating step can include the step of annotating the located fields for further processing. Subsequently, the transcoding step can further include the steps of determining whether the annotated fields can be normalized. If it is determined that the annotated fields will be normalized, the annotated fields can be normalized. The normalizing step can include one of truncating the annotated fields, and/or re-factoring the annotated fields. Otherwise, the form element can be discarded during the transcoding step.

BRIEF DESCRIPTION OF THE DRAWINGS

There are shown in the drawings embodiments which are presently preferred, it being understood, however, that the invention is not limited to the precise arrangements and instrumentalities shown, wherein.

DETAILED DESCRIPTION OF THE PREFERRED EMBODIMENTS

The present invention is a content sanitation transcoding engine. The content sanitation transcoding engine of the present invention can scan markup to detect the signature of known viral content. The transcoding engine can render transcoded markup sans the detected viral content. Thus, the transcoding engine of the present invention can transcode markup containing malicious content into markup containing only non-malicious, sanitized content.

Importantly, inasmuch as the content sanitation transcoding engine of the present invention can identify patterns in markup, in a preferred aspect of the present invention, the transcoding engine behaves as a transcoding intermediary system which can identify elements of a privacy policy and can scan markup for content which violates the identified elements. In particular, the transcoding engine of the preferred aspect of the invention can enforce the terms of a privacy policy specified according to the Platform for Privacy Preferences Protocol (P3P). Subsequently, the transcoding engine can produce markup absent the offending elements.

Figure 1:
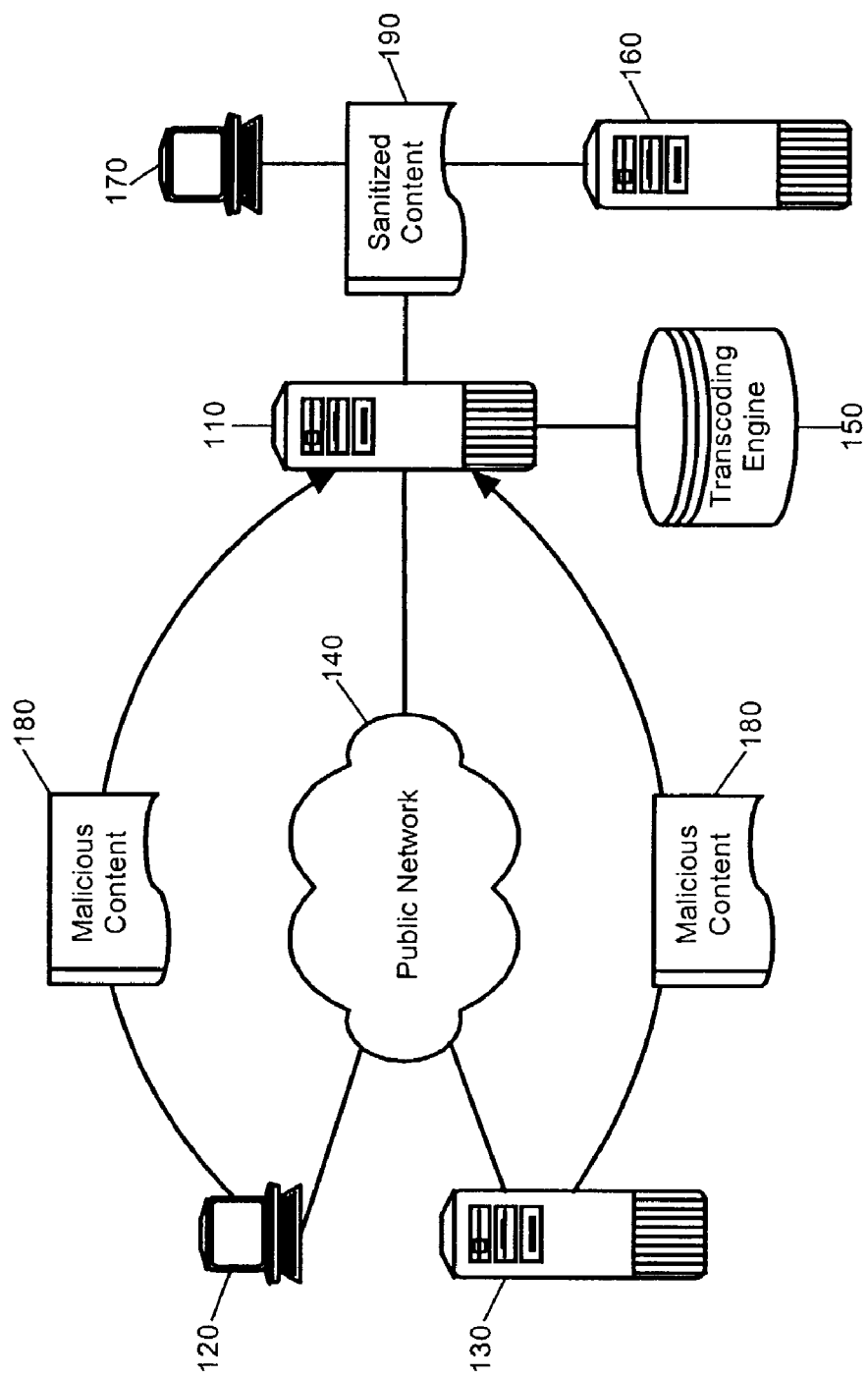
FIG. 1 is a schematic illustration of a content sanitation transcoding system disposed in a public network in accordance with one aspect of the inventive arrangements; and, FIG. 2 is a flow chart illustrating a process for sanitizing content in the content sanitation transcoding system of FIG. 1.

FIG. 1 is a schematic illustration of a content sanitation transcoding engine 150 disposed in a public network 140 in accordance with the inventive arrangements. As shown in FIG. 1, client computing device 120 can reside outside of the enterprise. The enterprise itself can include a transcoding server 110 configured to host the transcoding engine 150 of the present invention. The transcoding server 110 can be communicatively linked to both internal client computing devices 170 and internal content hosts 160. Notably, the content hosts 160 can serve content to devices about the public network 140, including the external client 120. The content can include markup specifying forms based input elements, for instance an Xform which can be transcoded into a presentation format by the transcoding engine 150 en route to the external client device 120.

The external client device 120 can facilitate the completion of the form specified in the markup, however, in some cases, the completed form can include malicious content 180 as is well-known in the art. In particular, text submitted to the content host 160 can include embedded therein viral content as has become the trend in recent times. In accordance with the inventive arrangements, however, the transcoding engine can intercept the forms based input data and can parse the data to detect the malicious content 180. The data itself can be transcoded into sanitized content 190 while the viral elements of the malicious content 180 can be excluded from the sanitized content 190.

Thus, despite detecting malicious content 180 within the data, the entirety of the data need not be discarded. Rather, those portions of the content deemed not to include malicious content 180 can be salvaged, while only the malicious content 180 can be excluded. In consequence, the integrity of the enterprise can be maintained without jeopardizing the efficiency of the application hosted in the content server 160. Moreover, in that the transcoding engine 150 can process the content sanitization, the solution described herein can be a centralized solution which relieves individual users within the enterprise of the burden of content monitoring.

Significantly, in one preferred aspect of the present invention, viral content within markup can be processed as an XML document defining a series of Xpath and extensible stylesheet (XSL) transformation patterns. While in this preferred aspect of the invention, it is assumed that the XML document has been well formed, as in the case of XHTML, and that the XML document can be processed by an XML compliant parsing process. Once parsed and formed into a document object model (DOM), the Xpath and XSL transformation patterns can be used to locate the virulent patterns within the XML document. Upon identifying each virulent pattern, an XSL transformation can be applied to the XML document in order to render the document harmless before forwarding the document to its intended recipient.

It is to be preferred that the XSL transformation maintains the desired presentation of the XHTML formatted content while re-factoring the malicious content. In consequence, a "lossless" immunization process can result. In a worst case scenario, content can be decoupled from the source document while a warning can be returned to an end-user notifying the end-user of the detection of malicious content. The warning can provide for the optional downloading of the malicious content. Nevertheless, once content has been sanitized, a digital signature can be applied to the transcoded content indicating to subsequent users that the content has been sanitized.

Importantly, in addition to detecting virulent content within markup, the content sanitizing transcoding engine 150 of FIG. 1 also can cleanse malicious content from markup which violates the terms of a privacy policy as specified according to P3P. As is well-known in the art, P3P provides a technical mechanism for ensuring that users are informed of the privacy policies of content hosts before the users relinquish personal information to the content hosts. Yet, P3P does not specify a manner in which the privacy policies specified according to P3P can be enforced. In accordance with the present invention, the transcoding engine 150, acting as a transcoding intermediary, can enforce the privacy policies specified according to P3P.

For instance, as illustrated in FIG. 1, the privacy policy of content host 130 can be specified according to P3P. A client 170 within the enterprise can request content from the content host 130. The content host 130, however, can forward into the enterprise malicious content 180 containing functional elements which violate the terms of the privacy policy specified according to P3P. Upon receiving the malicious content 180 within the transcoding server 110, the transcoding engine 150, acting as a transcoding intermediary, can remove the offending functional elements from the malicious content 180, when transcoding the markup into sanitized content 190. Thus, the client 170 within the enterprise can be shielded from the offending elements of the malicious content 180.

In a preferred aspect of the present invention in which the terms of a privacy policy can be enforced by a transcoding intermediary, the transcoding intermediary can access and acquire the P3P-compliant policy of an origination Web site. The policy subsequently can be compared to the content and functionality of documents served by the origination Web site. In consequence, it can be determined whether the content and functionality of the documents violate the terms of the privacy policy. Where the terms have been violated, the offending portions of the document can be corrected through the use of suitable Xpath expressions and XSLT modifications as in the case of sanitizing viral content from a malicious document.

Figure 2:
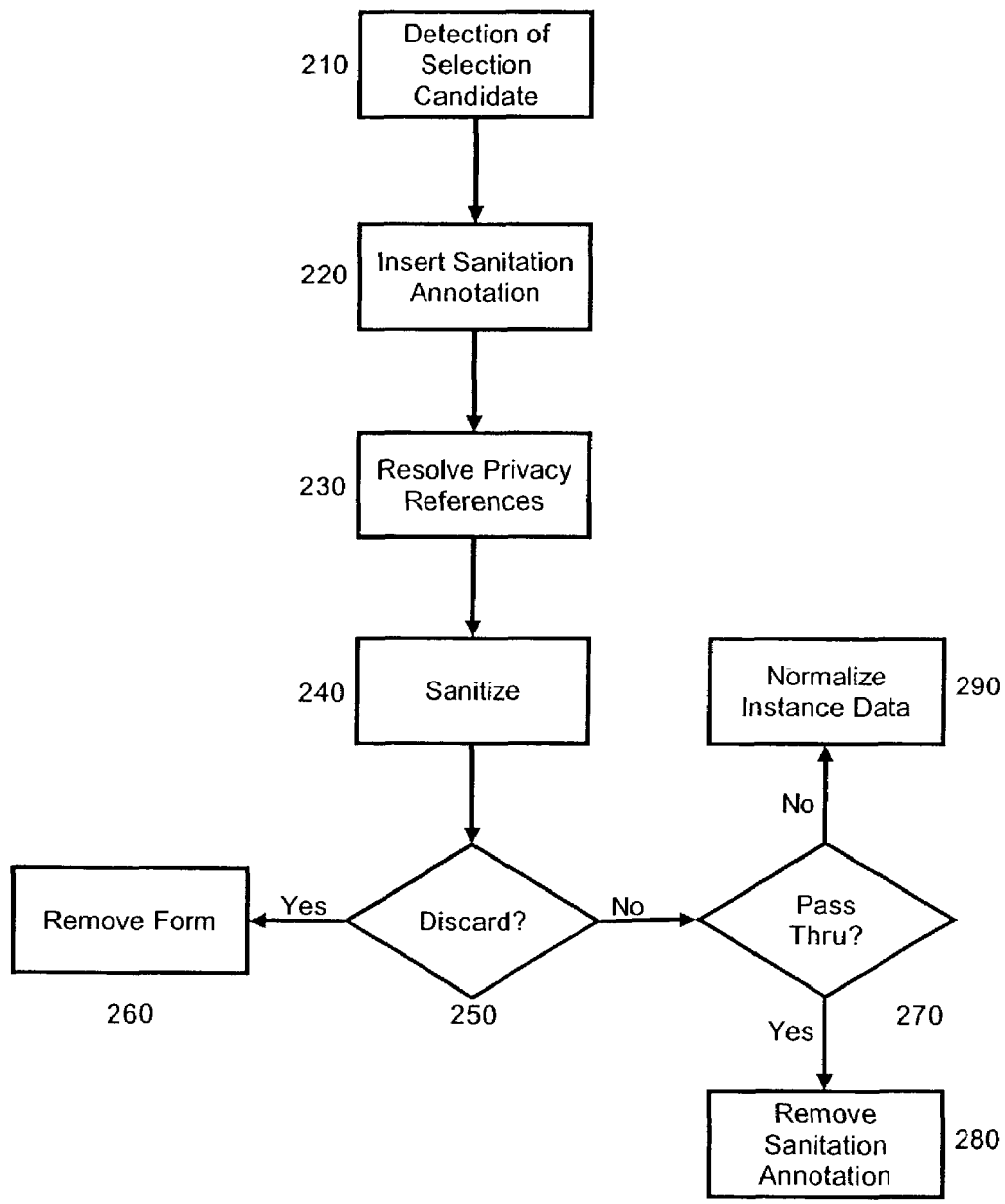

FIG. 2 is a flow chart illustrating a process for the sanitization of content processed in the content sanitation transcoding system of FIG. 1. Initially, an incoming document can be formatted so that sanitation candidates can be identified and selected therein. In the case of a well-formed document, an XML parser can create a DOM of the document which can be used subsequently in the content sanitization process. Where the document has not been well-formed, however, allowances can be made in order to convert the document into a well-formed document, as is known in the art.

Beginning in block 210, once the document has become well-formed, Xpath and XSLT processes can be used to find matching patterns in the document that have the potential to contain malicious or otherwise harmful content. When malicious content has been identified through the matching patterns, the matching patterns can be passed to the next logical step, e.g. <xsl:template pattern="FORM[contains (@action,"myemailserver")]">. In any case, in block 220, those node elements of the DOM which contain potentially malicious content can be annotated with an XML schema annotation. Notably, when inserting the sanitation annotations in the document, a finer grain of control can be exerted over the sanitation process through varying extensions of the inserted sanitation annotations, e.g.

<xsd:annotation><xsd:
  appinfo><arw.sanitationcandidate>XHTML-XFORM</
  arw.sanitationcandidate></ xsd:appinfo></xsd:annotation>

In block 230, referenced P3P policies can be examined and compared against the content of the document. Notably, the P3P compliant policies can be contained in an HTTP request header, internally within the enterprise, or the P3P compliant policies can be accessed through an external uniform resource identifier (URI). Elements of the document which conflict with the privacy policy can be annotated for subsequent sanitization processing, e.g. <POLICY-REF about="/P3P/Policy.corporate.xml"><EXCLUDE>/cgi-bin/*</EXCLUDE></POLICY-REF>.

In block 240, a document processor such as a SAX based document processor can locate the annotated elements of the document. The sanitization rules followed in block 240 can be specific to the annotated elements. In general, in block 250 each sanitization rule can be applied to the individual annotated elements to determined whether to remove the annotated element, or whether the annotated element such as a form can remain in the transcoded document. Where the element cannot be sanitized and is to be discarded in its entirety, in block 260 the element can be removed. Notably, the sanitization rule set can be extended as required in order to create a scheme sufficient to process more complex rule sets.

In block 270, if the element can be sanitized, or need not be sanitized, it can be determined whether the element can flow through to the transcoded document without further modification. If so, in block 280 the sanitization annotation of the element can be removed. Otherwise, in block 290, the element can be normalized. Specifically, the offending portion of the element can be removed in a normalization process. Such normalization can include, for instance, the truncation or re-factorization of one or more input fields of a form element.

Importantly, as content-based security concerns arise more frequently in the enterprise, it is clear that a centralized solution will be desirable. More particularly, the task of content-based security can no longer remain within the purview of the individual user. Incorporating a centralized transcoding intermediary addresses the clear deficiencies of the prior art. In particular, the centralized transcoding intermediary not only protects the enterprise from malicious content, but where the malicious content originates in a device positioned intermediately between the document source and the transcoding intermediary, the transcoding intermediary also protects the document source. Thus, the transcoding engine of the present invention acts as a means to sanitize malicious content, including not only viral patterns, but also elements of the content which violate the terms of a privacy policy.

The present invention can be realized in hardware, software, or a combination of hardware and software. An implementation of the method and system of the present invention can be realized in a centralized fashion in one computer system, or in a distributed fashion where different elements are spread across several interconnected computer systems. Any kind of computer system, or other apparatus adapted for carrying out the methods described herein, is suited to perform the functions described herein.

A typical combination of hardware and software could be a general purpose computer system with a computer program that, when being loaded and executed, controls the computer system such that it carries out the methods described herein. The present invention can also be embedded in a computer program product, which comprises all the features enabling the implementation of the methods described herein, and which, when loaded in a computer system is able to carry out these methods.

Computer program or application in the present context means any expression, in any language, code or notation, of a set of instructions intended to cause a system having an information processing capability to perform a particular function either directly or after either or both of the following a) conversion to another language, code or notation; b) reproduction in a different material form. Significantly, this invention can be embodied in other specific forms without departing from the spirit or essential attributes thereof, and accordingly, reference should be had to the following claims, rather than to the foregoing specification, as indicating the scope of the invention.

We claim:

1. A transcoding engine comprising:
   a plurality of patterns, each said pattern identifying malicious content in a well-formed document;
   an annotation processor configured to annotate portions of said well-formed document which match said patterns;
   a content sanitization processor configured to normalize said annotated portions in a transcoded document; and a privacy policy resolution processor configured to identify terms of a privacy policy and to annotate portions of said well-formed document which violate said terms.

2. The transcoding engine of claim 1, wherein said patterns comprise a set of Xpath expressions.

3. The transcoding engine of claim 1, wherein said patterns comprise a set of extensible stylesheet (XSL) transformation expressions.

4. The transcoding engine of claim 1, wherein said patterns comprise a set of Xpath and XSL transformation expressions.

5. A transcoding engine comprising:
a plurality of patterns, each said pattern identifying malicious content in a well-formed document;
an annotation processor configured to annotate portions of said well-formed document which match said patterns;
a content sanitization processor configured to normalize said annotated portions in a transcoded document; and,
a privacy policy resolution processor configured to particularly process privacy policies specified according to the Platform for Privacy Preferences (P3P).

6. A content sanitization method, the method comprising the steps of:
ensuring that a subject document has been well-formed;
locating malicious content in said well-formed document;
annotating said malicious content for further processing;
transcoding said well-formed document, said transcoding producing a transcoded document, but excluding said annotated content from said transcoded document;
accessing a privacy policy, said privacy policy comprising one or more privacy terms;
locating content in said well-formed document which violates one or more of said privacy terms in said privacy policy; and,
annotating said located content which violates said privacy terms.

7. The method of claim 6, wherein said locating step comprises the step of locating fields of a form element which contain candidate text that can be interpreted as malicious content, and wherein said annotating step comprises the step of annotating said located fields for further processing.

8. The method of claim 7, wherein said transcoding step further comprises the steps of:
determining whether said annotated fields can be normalized;
if it is determined that said annotated fields can be normalized, normalizing said annotated fields; and,
if it is determined that said annotated fields cannot be normalized, discarding said form element during said transcoding step.

9. The method of claim 8, wherein said normalizing step comprises one of the steps of truncating said annotated fields, and re-factoring said annotated fields.

10. A machine readable storage having stored thereon a computer program for performing content sanitization, said computer program comprising a routine set of instructions for causing the machine to perform the steps of:
ensuring that a subject document has been well-formed;
locating malicious content in said well-formed document;
annotating said malicious content for further processing;
transcoding said well-formed document, said transcoding producing a transcoded document, but excluding said annotated content from said transcoded document;
accessing a privacy policy, said privacy policy comprising one or more privacy terms;
locating content in said well-formed document which violates one or more of said privacy terms in said privacy policy; and,
annotating said located content which violates said privacy terms.

11. The machine readable storage of claim 10, wherein said locating step comprises the step of locating fields of a form element which contain candidate text that can be interpreted as malicious content, and wherein said annotating step comprises the step of annotating said located fields for further processing.

12. The machine readable storage of claim 11, wherein said transcoding step further comprises the steps of:
determining whether said annotated fields can be normalized;
if it is determined that said annotated fields can be normalized, normalizing said annotated fields; and,
if it is determined that said annotated fields cannot be normalized, discarding said form element during said transcoding step.

13. The machine readable storage of claim 12, wherein said normalizing step comprises one of the steps of truncating said annotated fields, and re-factoring said annotated fields.

* * * * *